United States Patent
Bonvin et al.

(10) Patent No.: US 8,878,475 B2
(45) Date of Patent: Nov. 4, 2014

(54) CURRENT LIMITING FOR A MOTOR WINDING

(75) Inventors: Frederic Bonvin, Longmont, CO (US); Diego Armaroli, Mortara (IT)

(73) Assignees: STMicroelectronics, Inc., Coppell, TX (US); STMicroelectronics S.R.L., Agrate Brianza (IT)

(*) Notice: Subject to any disclaimer, the term of this patent is extended or adjusted under 35 U.S.C. 154(b) by 687 days.

(21) Appl. No.: 12/940,438

(22) Filed: Nov. 5, 2010

(65) Prior Publication Data

US 2012/0112681 A1 May 10, 2012

(51) Int. Cl.
*H02H 7/09* (2006.01)
*G11B 19/28* (2006.01)

(52) U.S. Cl.
CPC ................ *G11B 19/28* (2013.01)
USPC ........... 318/400.22; 318/400.03; 318/400.26; 318/434

(58) Field of Classification Search
USPC ............ 318/400.03, 400.06, 400.22, 400.26, 318/434, 504
See application file for complete search history.

(56) References Cited

U.S. PATENT DOCUMENTS

| | | | |
|---|---|---|---|
| 4,167,693 A * | 9/1979 | Liska et al. | 318/400.01 |
| 4,558,264 A * | 12/1985 | Weischedel | 318/400.03 |
| 5,457,364 A * | 10/1995 | Bilotti et al. | 318/434 |
| 6,208,099 B1 * | 3/2001 | Kwon | 318/432 |
| 7,154,240 B2 * | 12/2006 | Watanabe | 318/434 |
| 7,323,841 B2 * | 1/2008 | Quirion | 318/434 |
| 7,369,345 B1 * | 5/2008 | Li et al. | 360/75 |
| 7,432,677 B2 * | 10/2008 | Heydt et al. | 318/400.01 |
| 7,466,906 B2 * | 12/2008 | Ueno et al. | 388/815 |
| 7,663,833 B2 * | 2/2010 | Aoki et al. | 360/75 |
| 7,690,253 B2 * | 4/2010 | Noda et al. | 73/510 |
| 7,791,297 B2 * | 9/2010 | Mueller et al. | 318/434 |
| 7,848,066 B2 * | 12/2010 | Yanagishima | 361/23 |
| 8,084,985 B2 * | 12/2011 | Ikeda et al. | 318/801 |
| 8,421,639 B2 * | 4/2013 | Bitsch et al. | 340/664 |
| 8,532,955 B2 * | 9/2013 | Tang et al. | 702/141 |
| 2003/0137265 A1* | 7/2003 | de Frutos | 318/468 |

* cited by examiner

*Primary Examiner* — Bentsu Ro
*Assistant Examiner* — Thai Dinh
(74) *Attorney, Agent, or Firm* — Seed IP Law Group PLLC

(57) ABSTRACT

Techniques and apparatus for limiting the current through a motor, such as a motor for rotating a rotatable element of a hard drive. The current can be limited based on a threshold. A first threshold value can be set for a first time period. A second threshold value can be set for a second time period in which the current through the motor rises. The second threshold value is lower than the first threshold value. A spike in the supply current upon accelerating the rotatable element of the motor can thereby be reduced or eliminated.

23 Claims, 4 Drawing Sheets

CURRENT LIMITING FOR A MOTOR WINDING

BACKGROUND OF THE INVENTION

1. Field of Invention

The techniques described herein relate to limiting the current through a motor winding, such a motor winding for rotating a hard disk drive.

2. Discussion of the Related Art

Hard disk drives are a type of non-volatile storage that are used to magnetically store information. In a typical hard drive, a disk coated with magnetic material is rotated at high speed by a spindle motor. A read/write head is positioned on the rotating disk by an arm that is actuated by a second motor. Information can be written to the disk by applying a magnetic field to a small section of the disk. The disk can be read by observing the magnetic field at successive recording locations. To rotate the disk, current is applied to the spindle motor to generate torque. A current limiting circuit may limit the amount of current drawn by the spindle motor.

SUMMARY

Some embodiments relate to a method of controlling a current through a motor based on a threshold. The method includes setting the threshold at a first threshold value for a first time period; and setting the threshold at a second threshold value for a second time period. The current through the motor rises during the second time period. The second threshold value is lower than the first threshold value. The method also includes limiting the current through the motor based on the threshold. Some embodiments relate to a computer readable storage medium having stored thereon instructions, which, when executed, control a circuit to perform the above method.

Some embodiments relate to a circuit for controlling a motor based on a threshold. The circuit includes a control circuit configured to set the threshold at a first threshold value for a first time period and to set the threshold at a second threshold value for a second time period. The second threshold value is lower than the first threshold value. The control circuit is configured to control the current through the motor to be limited based on the threshold.

The foregoing is a non-limiting summary of some embodiments of the invention.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the invention.

DETAILED DESCRIPTION

Hard disk drive manufacturers may impose constraints on the amount of supply current that can be provided to a hard drive. The amount of current drawn by the spindle motor can be a significant component of the overall current used by the hard drive. The amount of current through the spindle motor can be limited by measuring the current through the motor and turning off a switch supplying current to the motor when a current threshold is exceeded. However, even when using such current limiting techniques, the Applicants have recognized that a significant increase in the current through the spindle motor can occur upon turning on the spindle motor. The initial spike in current through the spindle motor can cause the overall current to the hard drive to exceed the maximum current specification for the hard drive. This situation could be prevented by imposing a very low current limit on the spindle motor. However, setting a very low current limit can result in decreased hard drive performance, as the spindle motor may not be able to provide rotational energy to the disk as quickly when the current to the spindle motor is reduced. For example, reducing the spindle current limit to a very low level may cause the hard drive to start up less quickly.

In some embodiments, the current limit for the spindle motor is set to different levels at different times. For example, the current limit can be set to a lower level during a transient period in which the spindle motor current is increasing and to a higher level after the initial transient period to allow more power to be supplied to the motor. Reducing the current limit during the appropriate time period can prevent a spike in current through the spindle motor. A control circuit can identify suitable times at which to change the current limit. Advantageously, in some embodiments, the torque provided to the rotatable element of the hard drive can be increased by approximately 20%, while avoiding spikes in the supply current. An embodiment of a suitable motor control circuit will be described with reference to FIG. 1.

Figure 1:
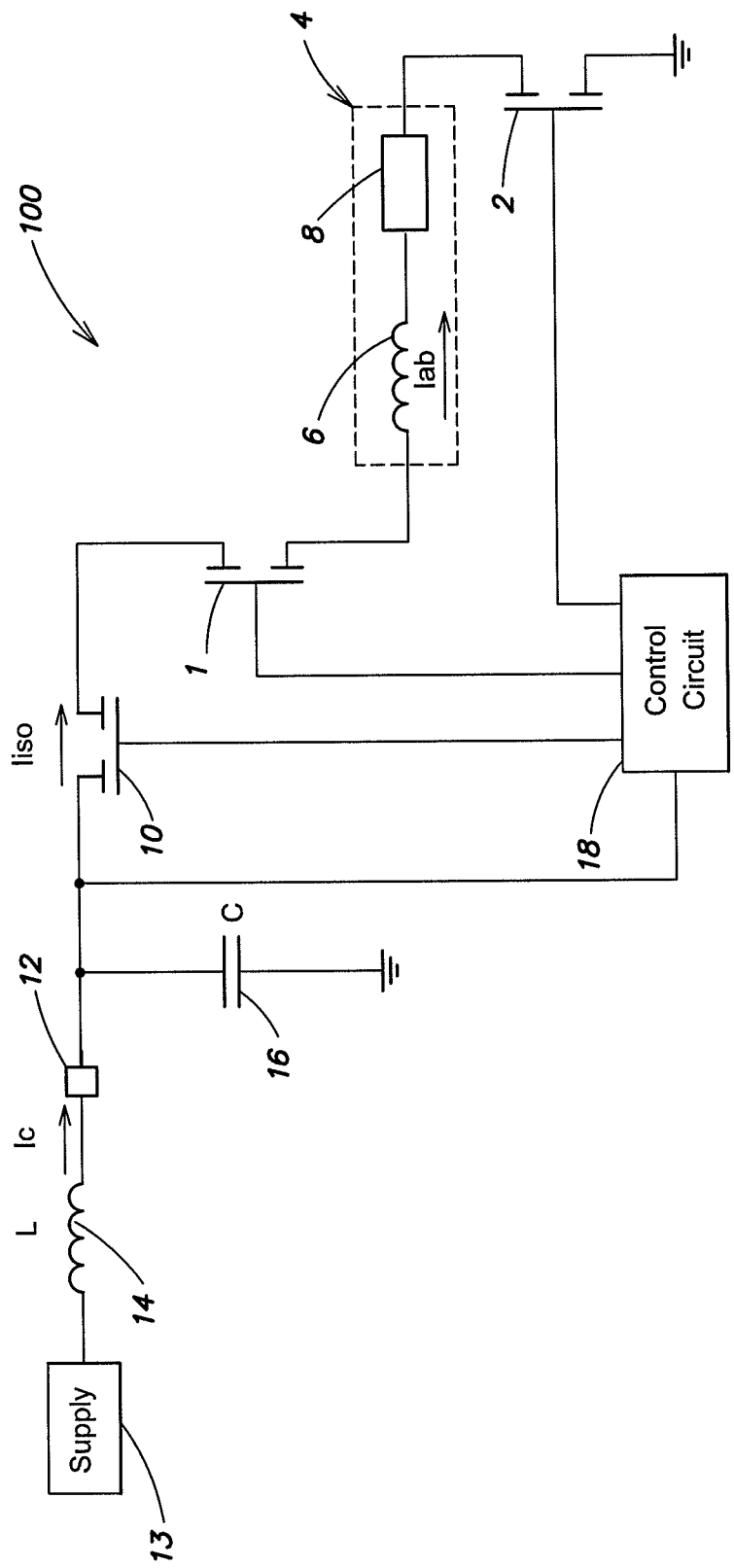
FIG. 1 shows a motor control circuit for controlling a motor winding, according to some embodiments.

FIG. 1 shows a motor control circuit 100 for controlling a motor winding 4, according to some embodiments. Motor winding 4 may be part of a motor that is configured to spin a rotatable component of a hard drive, but is not limited in this respect. In some embodiments, the motor may be a three phase motor and the motor winding 4 may include two windings in series out of the three windings of a three phase motor. For purposes of illustrating the principles discussed herein, the control of a first motor winding 4 will be discussed with reference to FIG. 1. Those of ordinary skill in the art will appreciate that these techniques may be applied for the control of a three-phase motor, as will be discussed further with respect to FIG. 4.

As shown in FIG. 1, motor control circuit 100 includes a first switch 1 and a second switch 2 electrically coupled to respective ends of the motor winding 4. Motor winding 4 is represented in FIG. 1 as including an inductive element 6 and a resistive element 8. An isolation switch 10 is connected between the first switch 1 and a power terminal 12. Power supply 13 may provide a DC voltage to the motor winding 4 via power terminal 12. Any suitable voltage may be applied, such as a DC voltage of 5 volts or 12 volts, for example. Other voltage levels may be used. The power lines leading to/from the power terminal 12 may be affected by parasitic inductance and/or capacitance. To represent these effects, an inductive element 14 and capacitive element 16 are shown in FIG. 1 as being coupled to power terminal 12. In some embodiments, a capacitor may be coupled between the power terminal 12 and ground, which may also be represented by capacitive element 16.

In some embodiments, the manufacturer may limit the current that may be drawn from the power supply 13. This limit can depend on the application. For example, for mobile or USB devices the limit may be 500 mA, and for enterprise server applications the limit may be 5 A. Any suitable current limit may be set.

The motor control circuit 100 also includes a control circuit 18 coupled to switches 1, 2 and 10 to control their operation. Control circuit 18 can control switches 1, 2 and 10 to turn on or off according to a suitable control algorithm or sequence. When the motor is turned off, the control circuit 18 may turn off isolation switch 10 to isolate the motor winding from the power terminal 12. When the hard drive is turned on, isolation switch 10 can be turned on by the control circuit 18. Switches 1 and 2 can then be turned on to allow current to flow through the motor winding 4 from the power terminal 12. Due to the inductance of the motor winding 4, as represented by inductive element 6, the current through motor winding 4 may increase at a gradual rate.

Figure 2:
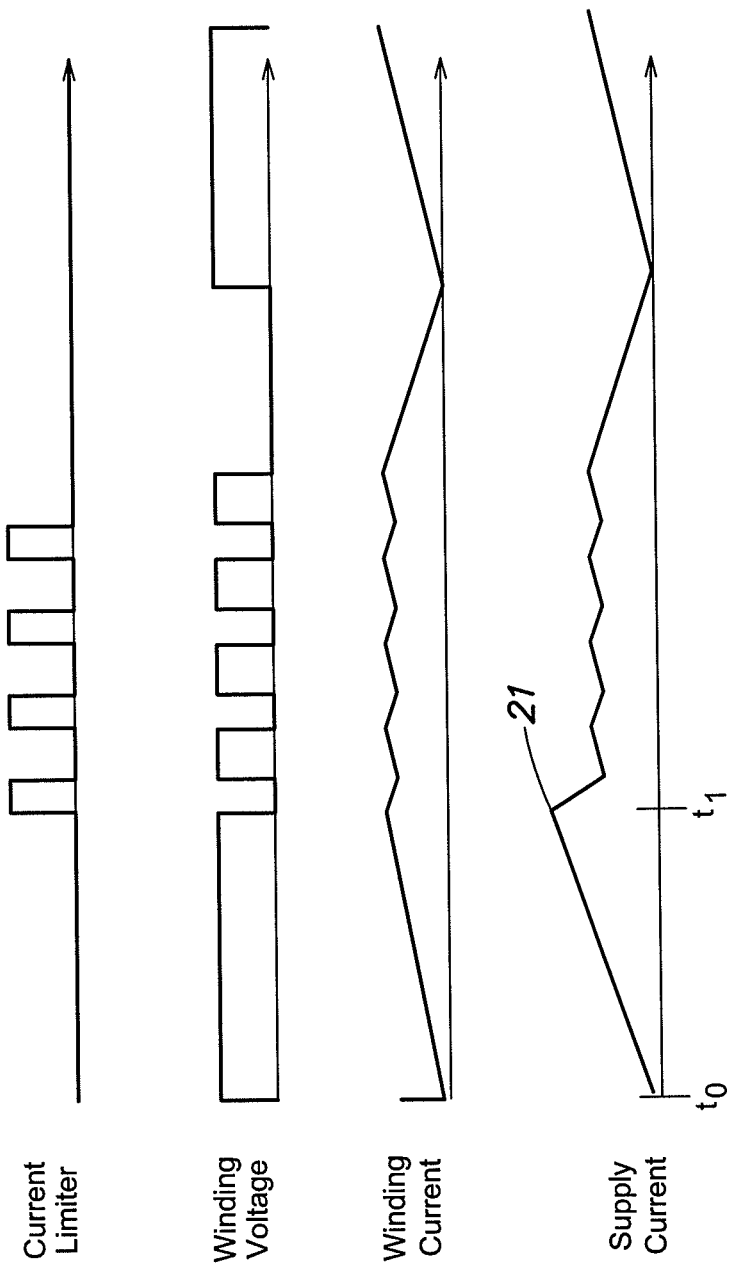
FIG. 2 shows waveforms illustrating how the winding voltage, winding current and power supply current change over time during the operation of a hard drive.

FIG. 2 shows waveforms illustrating how the winding voltage, winding current and power supply current change over time during the operation of a hard drive. FIG. 2 also shows a waveform illustrating the times at which a current limiter operation occurs to limit the amount of current that flows through the motor winding 4.

With switch 10 on, at time $t_0$ the switches 1 and 2 are turned on to allow current to flow through the motor winding 4. As a result, a substantially constant winding voltage may be established across the motor winding 4 by the connection to the power terminal 12. As shown in FIG. 2, the current through the motor winding 4 gradually increases between time $t_0$ and $t_1$. At time $t_1$, the control circuit 18 detects that the current through the motor has exceeded a threshold, and turns off switch 1 to disconnect the motor winding 4 from the power terminal 12. This operation is shown in FIG. 2 at time $t_1$ by the start of the current limiter operation, and the resulting drop in the winding voltage. The current through the motor winding 4 then gradually falls below the threshold, and the switch 1 is turned on again. Once the current again exceeds the threshold, the current limiting operation begins again, and switch 1 is turned off. Switch 1 turned on and off in this manner, causing the winding and supply current to ripple above and below the threshold, as shown in FIG. 2.

As discussed above, the Applicants have recognized and appreciated that the current through the power terminal 12 can spike when the motor is turned on. The current spike 21 is believed to be caused by the resonant LC circuit created by inductive element 14 and capacitive element 16. The current spike 21 can exceed the overall current limit for the hard drive.

In some embodiments, the control circuit 18 can set a lower threshold current level for the motor at the start of disk acceleration to avoid the spike in current through the motor. After this period, the threshold current level though the motor can be increased to a higher steady state value to allow a higher steady-state current to be supplied to the motor winding.

Figure 3:
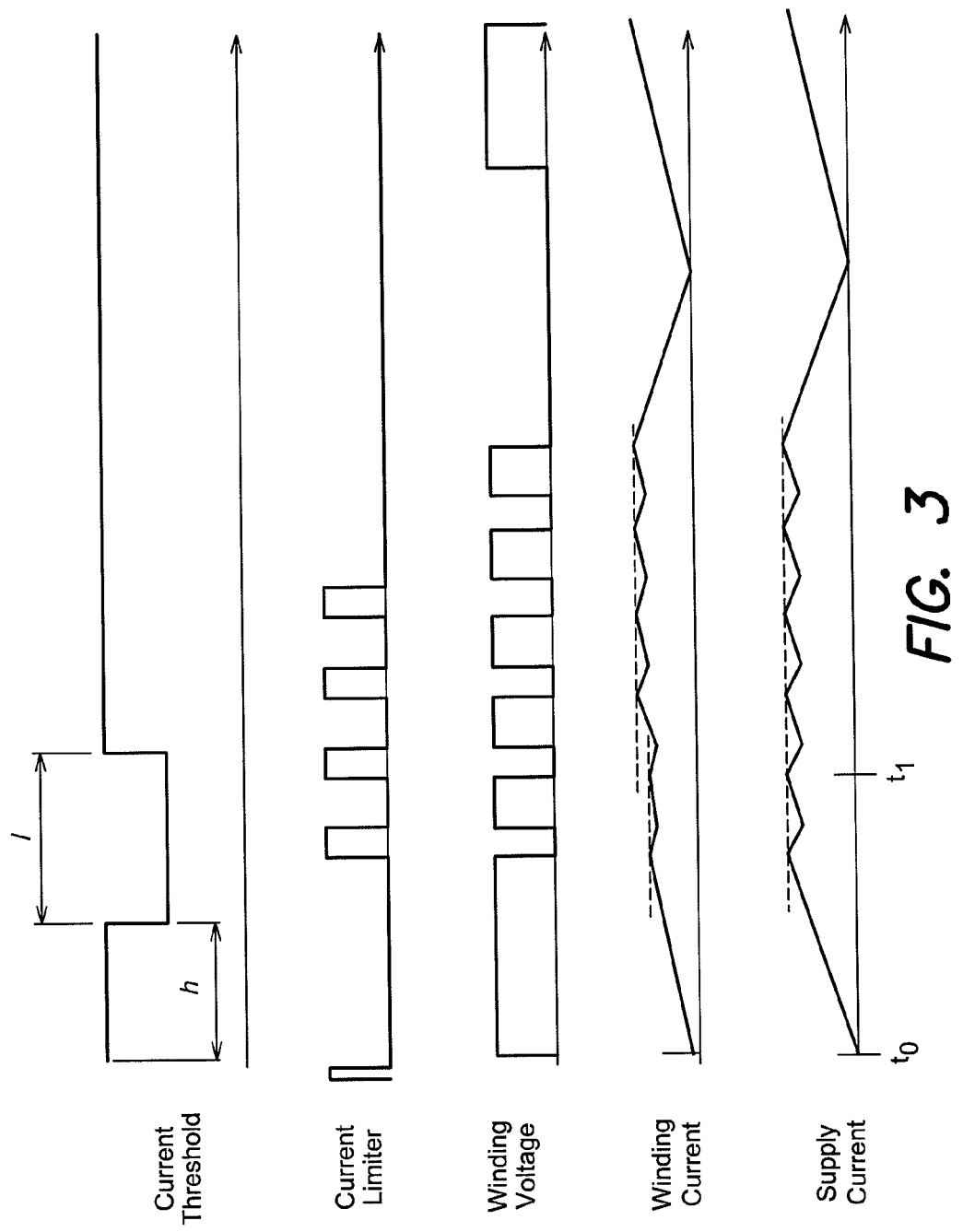
FIG. 3 shows waveforms illustrating the winding voltage, winding current, power supply current, current limiter operation, and current threshold according to some embodiments.

FIG. 3 shows waveforms illustrating the winding voltage, winding current, power supply current, current limiter operation, and current threshold according to some embodiments. As shown in FIG. 3, the current threshold for the motor winding 4 may initially be set to a high value. After a period of time h, the control circuit 18 then reduces the current threshold to a lower value. Any suitable technique may be used to determine when the current threshold is to be reduced. In some embodiments, the current threshold may be reduced a determined period of time h after the last current limiter operation, as shown in FIG. 3. Any suitable time period may be selected, and in some implementations the time period may be about 22 microseconds. However, it should be appreciated that this is an example of a suitable time period, and different time periods may be used to achieve the same result in various implementations. Furthermore, the current threshold need not be reduced at a determined period of time after the last activation of the current limiter, as any other suitable indicator may be used to the reduce the threshold value before a spike in supply current occurs.

As shown in FIG. 3, when the current to the motor winding 4 is increased, the current limiter operation begins at an earlier time during the rising current waveform (compared to the operation shown in FIG. 2), thereby preventing or reducing the spike in the supply current. After a period of time l, the control circuit 18 sets the current threshold to the high level again to allow a higher steady state current to flow through the motor winding 4. Any suitable technique may be used to determine when the current threshold is to be raised. In some embodiments, the current threshold may be increased a determined period of time l after the current threshold has been lowered. In some embodiments, the current threshold is maintained at the low value for a period of time sufficient to avoid the spike in supply current voltage. In some embodiments, the current threshold may be increased in response to determining that the current threshold has been reached a certain number of times (such, as one, two or three times, for example). The threshold may then be increased to enable additional current to flow to the motor winding 4. In some embodiments, the lower current threshold during period l may be approximately 20% lower than the higher current threshold during period h. However, the techniques described herein are not limited in this respect, as any suitable ratio between current thresholds may be used.

Figure 4:
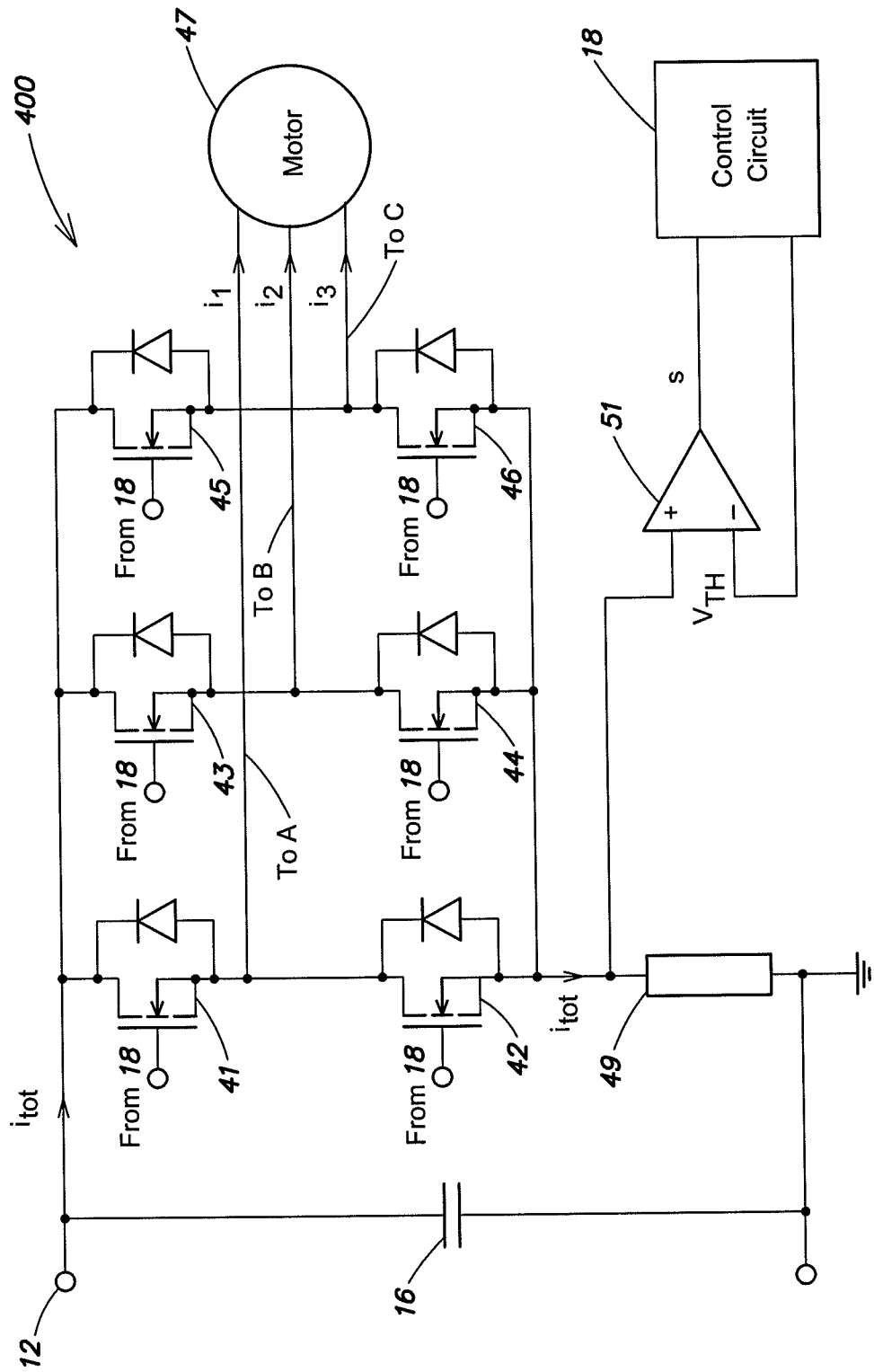
FIG. 4 shows a circuit for controlling a three phase motor, according to some embodiments.

FIG. 4 shows a circuit 400 for controlling a three phase motor, according to some embodiments. Circuit 400 includes six switches 41-46 which may be transistors implemented as MOSFETS, for example. For purposes of illustration, switches 41-46 are shown in FIG. 4 as being implemented as transistors with associated body diodes. However, any suitable switches may be used.

As shown in FIG. 4, the first terminal of switch 41 is coupled to power terminal 12. The second terminal of switch 41 is coupled to a first winding A of a three phase motor 47 and a first terminal of switch 42. The second terminal of switch 42 is coupled to ground through a sense resistor 49. The first terminal of switch 43 is coupled to power terminal 12. The second terminal of switch 43 is coupled to a second winding B of the three phase motor 47 and to a first terminal of switch 44. The second terminal of switch 44 is coupled to ground through sense resistor 49. The first terminal of switch 45 is coupled to power terminal 12. The second terminal of switch 45 is coupled to a third winding C of the three phase motor 47 and to a first terminal of switch 46. The second terminal of switch 46 is coupled to ground through sense resistor 49. Switches 41-46 are controlled by signals from control circuit 18. Circuit 400 also includes a comparator 51 that detects a voltage at sense resistor 49 that represents the total current through the motor 47, and compares this voltage with threshold voltage $V_{TH}$.

In operation, switches 41-46 are turned on in sequence to supply power to the three windings of the three phase motor 47. In the first phase, switches 41 and 44 are controlled to be turned on and the remaining switches are turned off. During the current limiter operation, switch 41 is turned off. In the second phase, switches 41 and 46 are controlled to be turned on and the remaining switches are turned off. During the current limiter operation, switch 41 is turned off. In the third phase, switches 43 and 46 are controlled to be turned on and the remaining switches are turned off. During the current limiter operation, switch 43 is turned off. In the fourth phase, switches 43 and 42 are controlled to be turned on and the remaining switches are turned off. During the current limiter operation, switch 43 is turned off. In the fifth phase, switches 45 and 42 are controlled to be turned on and the remaining switches are turned off. During the current limiter operation, switch 45 is turned off. In the sixth phase, switches 45 and 44 are controlled to be turned on and the remaining switches are turned off. During the current limiter operation, switch 45 is turned off. However, a different sequence may be used depending on the application and the direction of rotation. Also, instead of having the current recalculating through the low side body diode when transistor 41 is OFF, for example, transistor 42 can be turned ON to achieve a better efficiency. Similar techniques may be used for the other transistors to improve the efficiency.

Control circuit 18 controls switches 41-46 to turn on and off during the appropriate phases and also turns off switches 41, 43, and/or 45 during the current limiter operation when the current through the three phase motor 47 exceeds the current threshold. Control circuit 18 sets the current threshold by adjusting the voltage $V_{TH}$ that is provided to the inverting input of comparator 51. For example, as shown in FIG. 3, control circuit 18 may set the current limit at a high level for steady state operation or a low level to prevent a current spike. Control circuit 18 adjusts the level of voltage $V_{TH}$ accordingly. Comparator 51 determines whether the voltage across sense resistor 49 at the non-inverting input of comparator 51 (representing the total current through the motor) exceeds the threshold voltage $V_{TH}$. The comparator 51 provides a signal s to control circuit 18 indicating whether the threshold has been exceeded. If so, the control circuit can initiate the current limiting operation by turning off the appropriate one of switches 41, 43, and/or 45, as illustrated in FIG. 3. The connections between control circuit 18 and switches 41-46 are not shown in FIG. 4 for simplicity of illustration.

Although the embodiments discussed above may limit the current based on making a voltage measurement representative of the motor current at a sense resistor 49, the invention is not limited in this respect. The current may be measured somewhere else, such as through the FET 41, 42, 43, 44, 45, 46 or through the isolation FET 10, for example.

Although the embodiments discussed above relate to a control circuit that can a motor based on two different current thresholds, the invention is not limited in this respect. Any number of current thresholds may be used, including two or more thresholds. Each threshold may be set at a constant level. However, in some embodiments, the threshold may be controlled to change gradually over time. In some embodiments, the threshold may be set digitally using a digital controller, and a digital to analog converter may convert the digital threshold value to an analog value. However, the techniques described herein are not limited in this respect.

Embodiments of controllers suitable for implementing control circuit 18 may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed to perform the functions recited above.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling a current through a motor of a hard disk drive based on an upper limit threshold, the method comprising:

setting the upper limit threshold at a first value for a first time period in which the motor accelerates rotation of a component of the hard disk drive;

setting the upper limit threshold at a second value for a second time period, wherein the current through the motor rises during the second time period, wherein the second value is lower than the first value, wherein the second time period occurs after the first time period and during operation of the hard disk drive; and limiting the current through the motor based on the upper limit threshold.

2. The method of claim 1, further comprising:
detecting a first signal representing the current through the motor.

3. The method of claim 2, further comprising:
comparing the first signal with the upper limit threshold,
wherein limiting the current through the motor comprises turning off a switch coupled between the motor and a power terminal, when the first signal exceeds the upper limit threshold.

4. The method of claim 1, further comprising:
changing the upper limit threshold from the first value to the second value.

5. The method of claim 4, wherein the upper limit threshold is changed from the first value to the second value when the first time period has elapsed.

6. The method of claim 1, further comprising:
changing the upper limit threshold from the second value to the first value.

7. The method of claim 6, wherein the upper limit threshold is changed from the second value to the first value when the second time period has elapsed.

8. The method of claim 1, wherein the upper limit threshold is a current limit.

9. The method of claim 1, wherein rotation of the component of the hard disk drive is accelerated during the second time period.

10. The method of claim 1, wherein the current through the motor rises during the first time period.

11. A computer readable storage medium having stored thereon instructions, which, when executed, control a circuit to perform a method of controlling a current through a motor of a hard disk drive based on an upper limit threshold, the method comprising:

setting the upper limit threshold at a first value for a first time period in which the motor accelerates rotation of a component of the hard disk drive;

setting the upper limit threshold at a second value for a second time period, wherein the current through the motor rises during the second time period, wherein the second value is lower than the first value, wherein the second time period occurs after the first time period and during operation of the hard disk drive; and limiting the current through the motor based on the upper limit threshold.

12. The computer readable storage medium of claim 11, further comprising:

detecting a first signal representing the current through the motor.

13. The computer readable storage medium of claim 12, further comprising:

comparing the first signal with the upper limit threshold,
wherein limiting the current through the motor comprises turning off a switch coupled between the motor and a power terminal, when the first signal exceeds the upper limit threshold.

14. The computer readable storage medium of claim 11, further comprising:

changing the upper limit threshold from the first value to the second value.

15. The computer readable storage medium of claim 14, wherein the upper limit threshold is changed from the first value to the second value when the first time period has elapsed.

16. The computer readable storage medium of claim 11, further comprising:

changing the upper limit threshold from the second value to the first value.

17. The method of claim 16, wherein the upper limit threshold is changed from the second value to the first value when the second time period has elapsed.

18. A circuit for controlling a motor of a hard disk drive based on an upper limit threshold, the circuit comprising:

a control circuit configured to set the upper limit threshold at a first value for a first time period in which the motor accelerates rotation of a component of the hard disk drive, and set the upper limit threshold at a second value for a second time period, wherein the second value is lower than the first value, wherein the second time period occurs after the first time period and during operation of the hard disk drive, and wherein the control circuit is configured to control the current through the motor to be limited based on the upper limit threshold.

19. The circuit of claim 18, further comprising a comparator configured to receive a signal representing the current through the motor and to compare the signal to the upper limit threshold.

20. The circuit of claim 19, wherein the control circuit is configured to turn off a switch coupled between the motor and a power terminal, when the signal exceeds the upper limit threshold.

21. The circuit of claim 18, wherein the control circuit is configured to change the upper limit threshold from the first value to the second value when the first time period has elapsed.

22. The circuit of claim 18, wherein the control circuit is configured to change the upper limit threshold from the second value to the first value when the second time period has elapsed.

23. A hard disk drive comprising the circuit of claim 18.

* * * * *